Re. 24597

May 6, 1958      D. B. LONES ET AL      2,833,899

ALTITUDE CONTROLLER

Filed Nov. 1, 1956      3 Sheets-Sheet 1

DAIN B. LONES,
SYDNEY E. WESTMAN,
INVENTORS.

BY John H. Wallace

May 6, 1958 D. B. LONES ET AL 2,833,899
ALTITUDE CONTROLLER
Filed Nov. 1, 1956 3 Sheets-Sheet 2

DAIN B. LONES,
SYDNEY E. WESTMAN,
INVENTORS.

BY John H. Wallace

DAIN B. LONES,
SYDNEY E. WESTMAN,
INVENTORS.

BY John H. T. Wallace

United States Patent Office 2,833,899
Patented May 6, 1958

2,833,899

ALTITUDE CONTROLLER

Dain B. Lones, Palos Verdes Estates, and Sydney E. Westman, Inglewood, Calif., assignors to The Garrett Corporation, Los Angeles, Calif., a corporation of California Application November 1, 1956, Serial No. 619,888

13 Claims. (Cl. 201—48)

This invention pertains to an aircraft instrument and more particularly to an instrument for converting barometric pressure changes to various electrical outputs which are useful in controlling the flight of an aircraft.

In modern aircraft it is very desirable to have some means for converting the barometric pressure changes into various electrical outputs in order to control the flight pattern of the aircraft. This is especially true in cases where the flight pattern is controlled by some type of autopilot. Electrical outputs representative of the change in the barometric pressure are required for maintaining the aircraft at a set altitude, and also for controlling the ascent or descent of an aircraft. In addition, other outputs representative of other quantities which are related to barometric pressure are sometimes desired in order to control the flight pattern of the aircraft.

The problem of supplying the desired outputs is complicated by the fact that extreme accuracy is required since, as the speed of present aircraft increases, any errors in the conversion are greatly magnified in their effect on the flight pattern of the aircraft.

Still another requirement of such an instrument is that it have a rapid response to changes in barometric pressure, without exhibiting undampened oscillations. If the instrument has too great an inherent error or too slow a response time, it will cause the flight pattern of the aircraft to be very erratic. As a result of these errors, the aircraft will oscillate in altitude when it is controlled by an autopilot.

Accordingly, it is an object of this invention to provide a novel aircraft instrument which is capable of accurately converting the measured barometric pressure into various electrical outputs required by other instruments in the aircraft.

Another object of this invention is to provide an instrument capable of converting the barometric pressure into various electrical outputs using only pneumatic and electromechanical devices.

Another object of this invention is to provide an aircraft instrument capable of converting barometric pressure into various electrical outputs with unique overtravel protection which prevents its operation beyond design limits.

Another object of this invention is to provide an instrument capable of converting baromatic pressure into an electrical output representative of the change in the barometric pressure so as to hold the aircraft at a preselected altitude.

It is another object of this invention to provide an instrument which is capable of maintaining the aircraft at a preselected altitude with a novel memory device so that the aircraft may be operated at other altitudes by other means, but may be returned to the preselected altitude by the memory device plus or minus the sensitivity range of the instrument.

It is another object of this invention to provide an instrument which will control the descent of an aircraft by uniquely converting the barometric pressure change to a varying electrical output.

These and other objects and advantages of the invention will be more easily understood by those skilled in the art from the following detailed description taken in conjunction with the attached drawings in which.

Figure 1:
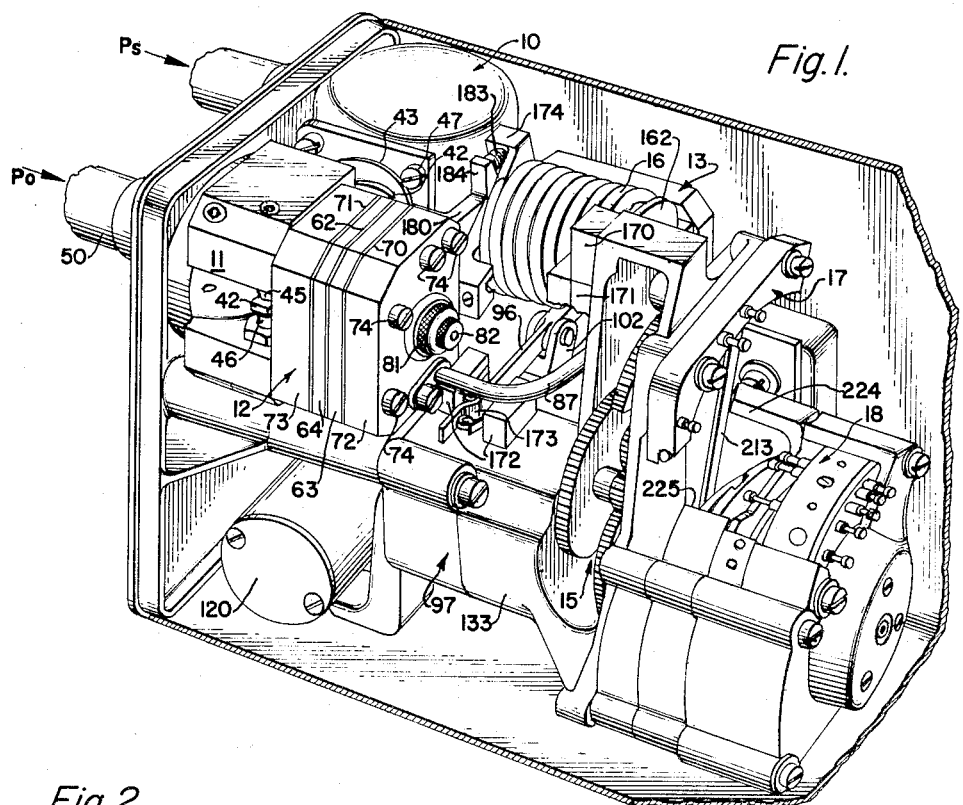
Fig. 1 is a perspective of the instrument showing the location and mounting of the various components thereof with some parts omitted for clarity.
Figure 2:
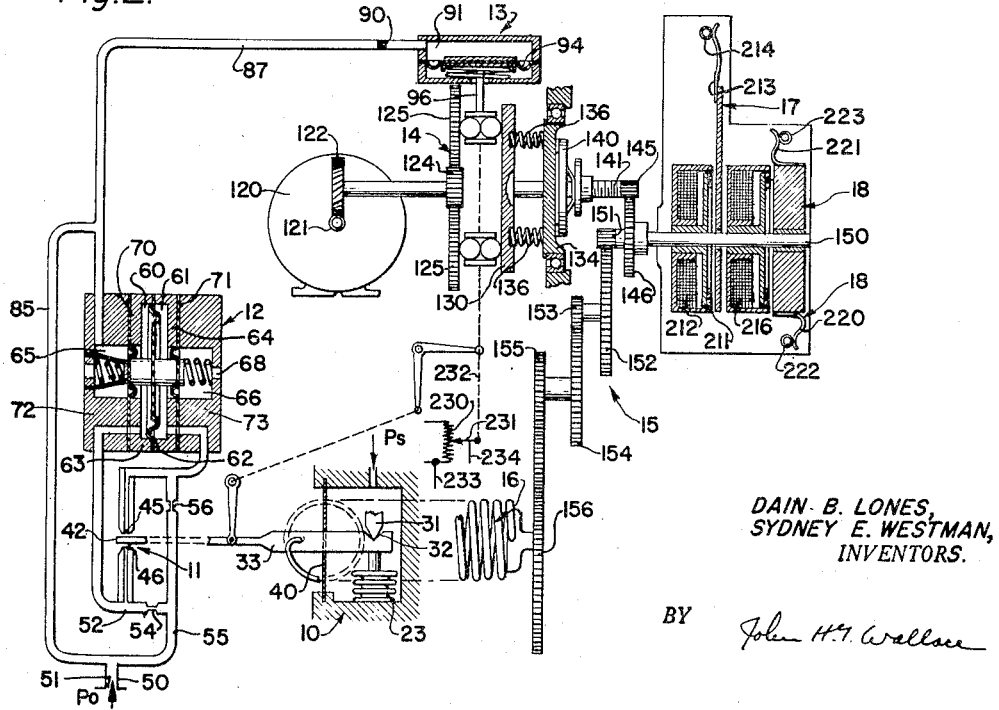
Fig. 2 is a schematic drawing showing the method of operation employed in the instrument.

Figs. 1 and 2 show the general arrangement and operation of the instrument, while the remaining figures show the detail construction of the various parts. An evacuated bellows 23, which is mounted in a sealed bellows housing 10, is attached to one end of a beam 33. The position of the opposite end of the beam is sensed by a pneumatic pick-off 11, the output of which is fed to a pneumatic amplifier 12. The output from the pneumatic amplifier 12 is transmitted to a pneumatic actuator 13 which controls the setting of a variable speed drive 14. The output of the variable speed drive, as transmitted through a gear train, is used to reposition a torsion spring 16 which is connected to the beam 33 so as to return the beam to a null or balanced position. The output of the variable speed drive is also used to position two variable resistances 17 and 18. The two variable resistances 17 and 18 are only controlled by the output shaft when their associated electromagnetic clutches are energized. This is necessary since, one of the variable resistances is wound so as to give a signal indicating positive and negative changes in altitude, while the other resistance is wound so as to indicate only negative changes in altitude. Thus one potentiometer operates to hold the aircraft at a set altitude while the other potentiometer controls its descent. The altitude hold potentiometer is driven through a friction clutch of such torque capacity that, in case the aircraft moves beyond the limits of the altitude hold potentiometer 17, the clutch will slip and render the gear train inoperative. Thus, the potentiometer will be inoperative and will remain so until the aircraft is again returned to an altitude within range of the altitude hold potentiometer 17. This arrangement provides a memory device which will return the aircraft to the altitude at which the electromagnetic clutch associated with the altitude hold potentiometer 17 was energized. With the above outline in mind, the invention will now be described in greater detail.

Figure 3:
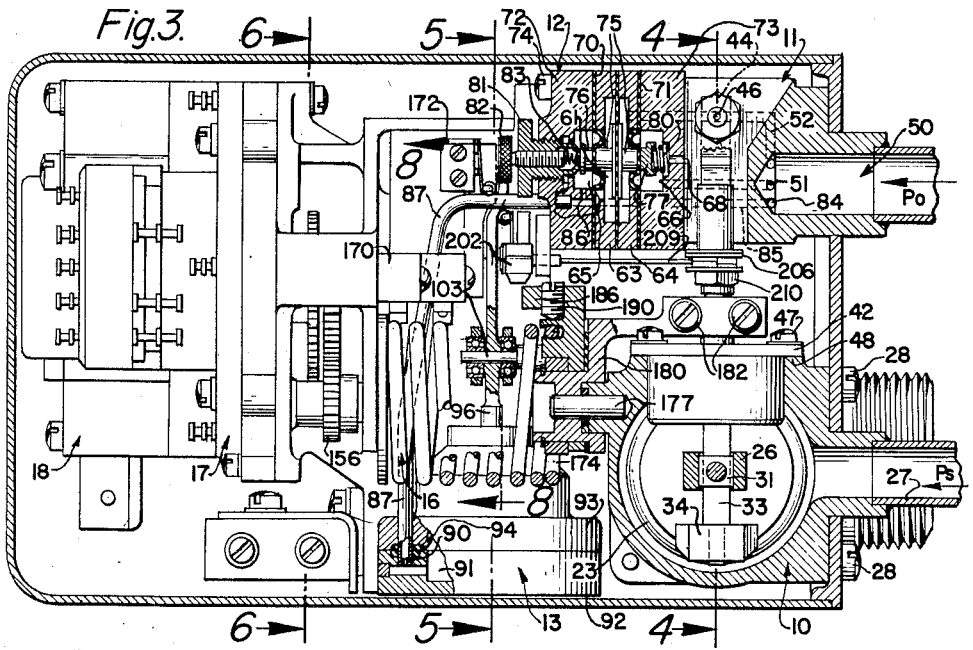
Fig. 3 is a plan view of the instrument with a portion of the bellows housing and amplifier shown in section.

As shown in Fig. 3, the bellows housing 10 is formed from an upper cup-shaped portion 20 which is joined and sealed to a lower cup-shaped portion 21 by any desired means such as an O-ring 22. The hermetically sealed and evacuated bellows 23 is mounted inside the housing 10 by means of a small cap screw 25 which passes through the bottom wall of the housing and threads into the lower wall 24 of the evacuated bellows. A suitable yoke 26 for connecting the bellows to the end of the beam 33 is attached to the top wall of the bellows by any desired means such as a small cap screw 30 which threads into the top wall of the bellows. The top member of the yoke 26 is provided with a downwardly projecting knife edge 31 which rests in a V-shaped groove 32 formed in one end of the beam 33. A counterweight 34 is attached to the extreme right-hand end of the beam to partially counterbalance the mass of the beam extending to the left of its pivot point. The measured barometric pressure is introduced into the interior of the housing 10 by means of a small tubular member 27, one end of which projects through the front wall of the outer housing of the instrument, and the other end of which is sealed to an opening in the housings. The housing 10 is secured to the front wall of the instrument housing by four cap screws 28.

The other end of the beam 33 extends through and is pivoted on a thin metal flexure seal 40. The flexure seal 40 is locked between an outwardly projecting shoulder 35 formed on the beam 33 and a nut 36 which threads over the opposite end of the beam. The outer edge of the flexure seal is retained between an inwardly projecting shoulder 41 formed on the end of a mounting ring 42 and the end of a locking nut 43 which threads into the opening of the mounting ring 42. The mounting ring 42 is retained and sealed in a circular opening in the upper portion of the housing 10 by any desired means such as four small cap screws 47 and a suitable O-ring gasket (not shown).

The above construction thus provides a means whereby the changes in the barometric pressure, which is introduced into the interior of a sealed bellows housing 10, may be converted into mechanical motion by deflection of the beam 33. An evacuated bellows is mounted in the bellows housing 10 and provided with a yoke so that it may be attached to one end of the balanced beam 33. The balanced beam is pivoted by means of the thin flexure seal 40 which, in addition to providing a fulcrum point for the beam 33, also seals the opening in the bellows housing 10 through which the beam passes. Thus, any change in the measured barometric pressure will be reflected as a movement of the bellows which, in turn will deflect the beam.

The left-hand end of the normally balanced beam 33 is provided with a flattened extension which forms a paddle or baffle 44. The baffle modulates the escape of fluid from the opposed orifices 45 and 46 in response to movement of the beam by the bellows. The orifice 46 is connected to a source of regulated fluid pressure, preferably pneumatic pressure, by means of a passageway 52 which terminates in an opening 51 in a tubular inlet 50. The source of controlled fluid pressure is introduced to the instrument through the tubular inlet 50. The orifice 45 is also connected to the tubular inlet 50 by means of a passageway 55 shown in Fig. 4. Both of the orifices 45 and 46 are threaded into openings formed in the frame 57 of the pick-off device and are provided with jam nuts 53 so that they may be locked in position. This allows accurate adjustment of the distance between the orifices and the baffle which, in turn, controls sensitivity of the pick-off.

The passageway 52 extends beyond the orifice 46 and connects with a chamber 60 of the pneumatic amplifier 12, while the passageway 55 which supplies the orifice 45 also extends beyond the orifice and connects with a chamber 61 of the amplifier. The amplifier 12 consists of four aligned chambers 60, 61, 65 and 66, which are formed by means of three flexible diaphragms 62, 70 and 71, the outer edges of which are clamped between annular members 63, 64, 72 and 73, respectively. The four annular members 63, 64, 72 and 73 are clamped together by means of a plurality of cap screws 74 which pass through the annular members and thread into the pick-off frame 57. The central portion of the three diaphragms 62, 70 and 71 are locked together so that they will move in unison by means of a stud 76, two spacing members 75, and a nut 77. A light spring 80 is provided in the chamber 66 so as to urge the diaphragm assembly to the left. The chamber 66 in addition is vented to the surrounding atmosphere through a central opening 68. The chamber 65 is connected to the source of regulated fluid pressure by means of a passageway 85 which terminates in an opening 84 in the tubular inlet 50. The chamber 65 is also provided with a bleed valve which consists of a hollow valve body 81 which threads into a center opening in the annular member 72. The end of the valve body 81, which projects into the chamber 65, is flattened and cooperates with the end surface of the stud 76 to form the bleed valve. A small spring 83 is mounted in the center of the valve body 81, and contacts the end surface of the stud 76. An adjusting screw 82, which threads into the valve body, is provided for adjusting tension of spring 83. The use of a light spring on each side of the diaphragm assembly permits mechanical balancing of the amplifier assembly.

The pneumatic amplifier 12 described above, provides a means whereby the difference in the modulated pressures existing in the passageways supplying the orifices 45 and 46 can be amplified and appear as a pneumatic pressure change in the chamber 65 of the amplifier. The orifices 45 and 46 are supplied with a regulated fluid pressure, preferably a pneumatic pressure, through suitable passageways which may contain restrictions 54 and 56 as shown in Fig. 2. Any movement of the baffle 44 will create a pressure difference between the passageways 52 and 55 which supply the orifices 44 and 45, respectively. The pneumatic amplifier 12 will amplify this small pressure difference and supply it as a fluid having a higher or lower pressure in the chamber 65 thereof. In addition, the amplifier 12 also changes the two-way motion of the beam into a single pneumatic pressure. The single pneumatic pressure can be used to control the movement of a single-ended actuator in which the pneumatic pressure works against a spring. Such an actuator is more compact than a double-ended actuator which utilizes two separate pneumatic pressures to operate. Thus, the two orifices 45 and 46 operate as an accurate pneumatic pick-off to sense very small movements of the balanced beam 33 caused by a change in the barometric pressure and the amplifier 12 amplifies this signal.

Figure 5:
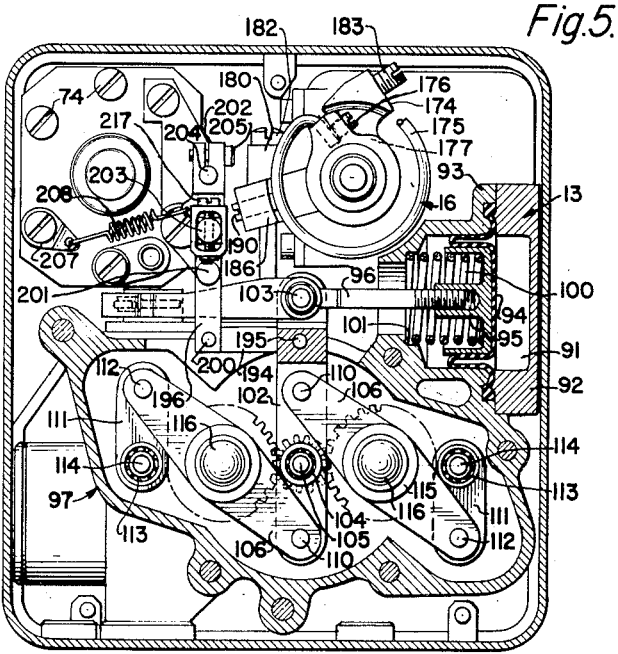
Fig. 5 is a transverse section taken along line 5—5 of Fig. 3, and showing the pneumatic actuator and variable speed transmission used in the invention.

The amplified pneumatic pressure appearing in the chamber 65 is transmitted to a single-ended pneumatic actuator 13 by means of a tube 87. The tube 87 is provided with a restricting orifice 90 so as to dampen the movements of the actuator 13 caused by movements of the beam. The actuator 13 consists of a chamber 91 which is formed by means of a cup-shaped housing 92 and a flexible diaphragm 94 which closes the top opening of the housing 92. The outer edge of the flexible diaphragm 94 is clamped between the housing 92 and a portion 93 of the frame 97 which contains the variable speed drive unit to be described below. A cup-shaped spring retainer 95 is placed on the side of the diaphragm opposite the chamber 91 and is urged into engagement with the diaphragm by means of a spring 100. The other end of spring 100 reacts against an inwardly projecting shoulder 101 formed in the portion 93 of the frame 97 so as to urge the cup-shaped spring retainer and diaphragm to the right as shown in Fig. 5.

Figure 7:
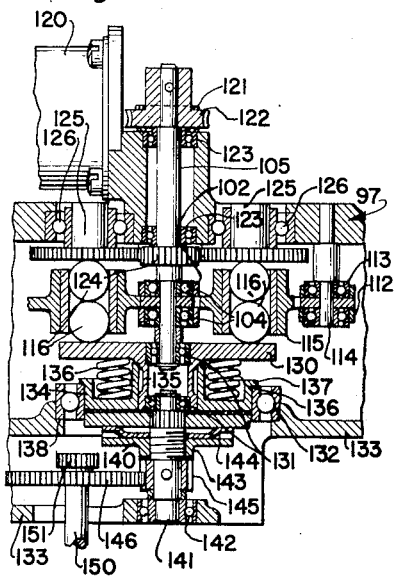
Fig. 7 is a partial horizontal section taken along line 7—7 of Fig. 6, showing the variable speed drive and friction clutch.

An actuating rod 96 is threaded into the spring retainer 95 at one end and is pivotally connected at its other end to a speed control link 102 by means of a pin 103. The speed control link 102 is rotatably mounted at its center on the end of an idler shaft 105 by means of ball bearings 104. Two ball links 106 are pivotally attached to the speed control link 102 at equal distances from the center of the idler shaft 105 by means of pins 110. The opposite ends of each of the ball links 106 are pivotally connected to separate idler links 111 by means of pins 112. The opposite end of each idler link is secured to a pin 114 which, in turn, is rotatably supported in the transmission frame 97 by means of ball bearings 113. The center portion of each of the ball links 106 is provided with a cylindrical cage which extends outwardly from both sides of the ball link so as to retain two ball members 116, as shown in Fig. 7.

The variable speed drive is driven by a substantially constant speed electric motor 120 which drives the idler shaft 105 through a worm 121 and worm wheel 122. The idler shaft 105 is rotatably mounted in the frame 97 by means of ball bearings 123 as shown in Fig. 7. Attached to the other end of the idler shaft 105 is a spur gear 124 which drives two diametrically opposed gear platens 125. The gear platens each have a stud shaft extending from one side which is rotatably mounted in the transmission frame 97 by means of a ball bearing 126. An output platen 130 is rotatably mounted on the extreme end of the idler shaft 105 by means of a ball bearing 131 and a second bearing 131 on the end of the transmission output shaft 141. A cup-shaped spring retaining member 134 is rotatably mounted in the wall 133 of the frame 97 by means of a ball bearing 132. A small outwardly projecting shoulder 137 is formed on the outer surface of the retaining member 134 and a similar shoulder 138 is formed on the bearing opening in the wall 133 so as to prevent axial movement of the retaining member 134 away from the output platen 130. A plurality of circumferentially spaced compression springs 136 are retained in the spring retaining member 134 and serve to urge the output platen 130 axially toward the gear platens 125. The spring retaining member 134 and the output platen 130 are provided with a suitable connection so that they will rotate together, yet permit the output platens to move axially relative to the retaining member 134, such as a splined connection. The radial surface of the spring retaining member 134 opposite the output platen, as seen in Fig. 7, serves as a clutch face plate and is provided with a suitable friction type lining (not shown). The driven member of the clutch 140 is secured to the end of the transmission output shaft 141 and is held in engagement with the clutch face on the bearing retaining member 134 by means of a spring washer 144. The force of the spring washer 144 may be adjusted by means of the adjusting nut 143, and thus the friction existing between the bearing member 134 and driven clutch plate may be accurately controlled.

Figure 6:
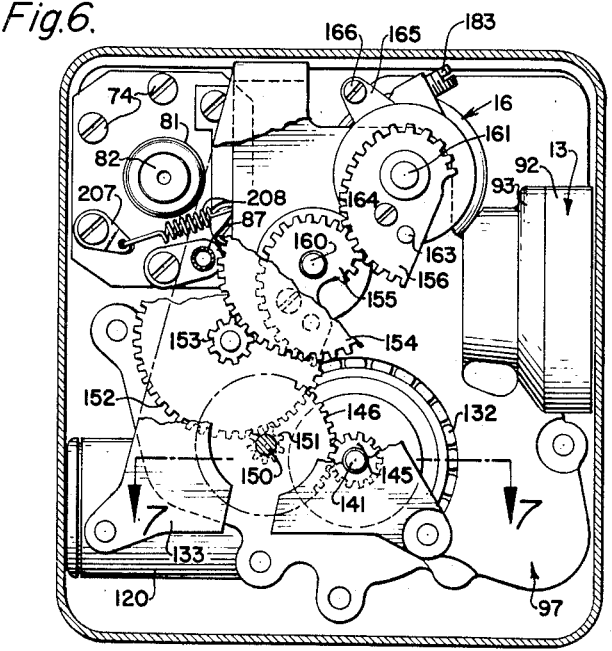
Fig. 6 is a transverse section taken along line 6—6 of Fig. 3, and showing the gear train used in the invention.

When the constant speed motor of the above described transmission rotates, it will drive the two gear platens 125 at a constant speed. If the speed adjusting link 102 is positioned so that the center of the ball members 116 are exactly in line with the centers of rotation of the gear platens 125, the ball members will not transmit enough torque to rotate the output platen 130. In this position the transmission output shaft 141 is at rest and the gear train shown in Fig. 6 is stopped. When the speed adjusting link 102 is moved in either direction by the pneumatic actuator 13, the centers of the balls 116 will be moved from the centers of the gear platens, thus rotating the balls. This rotation of the balls 116 will be transmitted by friction from one of the balls to the other ball and then to the output platen 130. The output platen, in turn, will rotate the driven clutch plate 140 through the friction clutch and thus rotate the transmission output shaft 141. The direction of rotation of the transmission output shaft 141 will, of course, depend upon which direction the balls 116 are moved relative to the center of rotation of the gear platens 125. Thus, the ball transmission will provide an infinitely variable rotational output in either direction within its operating range.

The gear transmission shown in Fig. 6 provides three stages of spur gearing and one stage of noncircular cam gearing between the transmission output shaft 141 and the shaft 161 on which the rear retainer for the torsion spring 16 is mounted. The transmission output shaft 141 is provided with a spur gear 145 which drives an intermediate gear 146. Coaxially mounted on the same shaft 150 with the spur gear 146 is a small pinion 151 which drives a second intermediate gear 152. Another pinion 153 is mounted coaxially with the second intermediate gear 152 and drives a third intermediate gear 154 which is attached to a shaft 160 which is rotatably mounted in the transmission frame 97 by any desired means (not shown). Also mounted on the shaft 160 is a noncircular cam gear 155 which drives a second noncircular cam gear 156 which is mounted on the shaft 161. A dowel pin 163, which passes through the noncircular cam gear 156 and into the rear torsion spring retainer 162, is used for angularly positioning the cam gear 156. A similar arrangement to that described above is also provided for positioning the cam gear 155 on the shaft 160.

The noncircular cam gears as a final stage of gearing perform the conversion of the altitude output of the gear transmission to a pressure output. It is necessary to convert the transmission output, which is in terms of altitude to a pressure output, in order to return the beam to a balance condition, since the beam responds to pressure changes. In addition to performing the above conversion, the cam gears make it possible for the electric output signal to represent altitude increments on a uniform scale regardless of the altitude at which the particular potentiometer was clutched in as will be explained below. As an example, suppose that the altitude hold potentiometer 17 equaled plus or minus 125 feet of altitude over its full scale of travel. The altitude hold potentiometer will then read plus or minus 125 feet over its full scale regardless of the altitude at which it is clutched in. This feature is important whether the instrument is used to detect changes in altitude, or to show actual altitude, because in either case the output signal will be a uniform signal.

Figure 8:
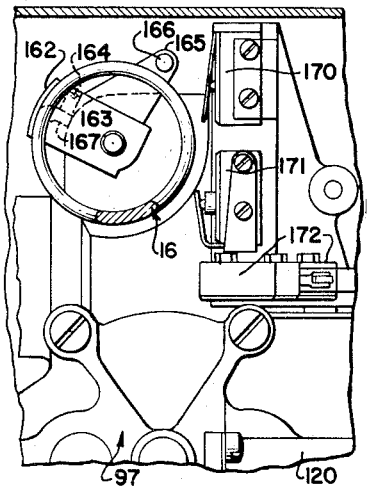
Fig. 8 is a partial transverse section taken along line 8—8 of Fig. 3, and showing the limit switches which limit the range of operation of the instrument.

The rear end 168 of the torsion spring 16 is retained in a radial hole 167 in the rear torsion spring retainer 162 by means of a small set screw 164 shown in Fig. 8. The rear torsion spring retainer 162 is also provided with a radially extending arm 165 which carries a stop pin 166. The stop pin 166 projects in an axial direction parallel with the axis of the torsion spring and serves to actuate the two limit switches 170 and 171 to limit the rotation of the rear torsion spring retainer member 162 by the transmission 17. The radial movement of the rear spring retaining member 162 may be limited to any desired levels by the stop pin and limit switches; for example, levels equal to minus 2,000 feet of altitude to plus 60,000 feet of altitude. It is necessary to limit the radial travel of the rear spring retaining member so as to prevent disengagement of the cam gears 155 and 156. The drive motor 120 is re-energized after it has been de-energized by the limit switches 170 and 171 by means of two reset switches 172 shown in Fig. 1. The reset switches 172 are actuated by a cam lever 173 which extends from the actuating arm 96 of the pneumatic actuator 13.

Figure 4:
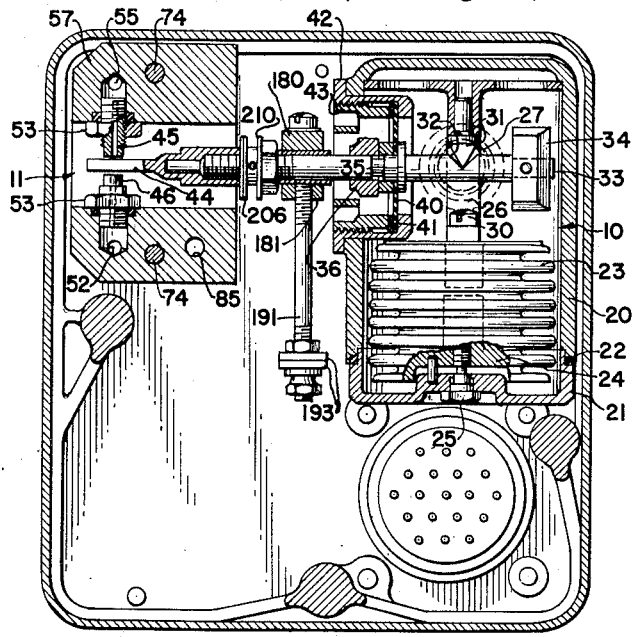
Fig. 4 is a transverse section taken along line 4—4 of Fig. 3, and showing the bellows chamber and balanced beam used in the invention.

The forward end 175 of the torsion spring 16 is retained in a radial hole 177 in the forward spring retainer 174 by means of a small set screw 176 shown in Fig. 5. The forward spring retainer 174 is rigidly connected to a torque arm member 180 which, in turn, is rotatably mounted on a pin 178, as shown in Fig. 3. The pin 178 is retained by means of a press fit in the bellows housing 10. The torque arm 180 is clamped to the balanced beam 33 by means of a U-shaped clamp member 181 which surrounds the beam and two small cap screws which pass through the torque arm and thread into the clamp member. An adjusting screw 183, which is threaded into the forward spring retainer 174 and bears against an ear 184, which projects upwardly from the torque arm 180, is used to adjust the initial torque of the torsion spring 16. A clamp member 186, which projects radially outward from the spring retainer 174 and, in addition, is rotatably mounted on the torque arm 180, is provided for adjusting the torsion spring rate. A counterweight arm 191, which threads into the bottom of the U-shaped clamp member 181, is provided so that small weights 193 may be added or removed from the end of the counterweight arm to accurately balance the beam 33 as shown in Fig. 4. This counterweight arrangement provides a means whereby the mass of the balanced beam 33 on each side of the pivot point may be accurately balanced.

The above described variable speed transmission and gear train thus provides a means whereby the torsion spring 16 may be continuously adjusted so as to accurately balance the beam 33 in a null position, regardless of the load applied to the beam by evacuated bellows 23. When the beam 33 is in the null or balanced position, the actuator 13 has moved the speed control link 102 to the position in which the balls 116 are in line with the center of rotation of the gear platens 125 of the variable speed transmission so as to bring the gear train to an "at rest" position.

In order to prevent undue oscillations of the balanced beam 33, a negative mechanical feed-back device, driven by the actuating rod 96 is provided in the instrument. This mechanical feed-back consists of a link 194 which is pivotally connected at one end to the speed control link 102 by means of a small pin 195. The opposite end of the link 194 is connected to one end of a rocker arm 196 by means of a pin 200. The rocker arm 196, in turn, is rotatably mounted on one end of a pin 201, the other end of which is retained in the amplifier housing by any desired means (not shown). The upper end of the rocker arm 196 is pivotally connected to the forked end of a torque arm 202 by means of a pin 203, whose position in the slotted opening in the end of the rocker arm 196 may be adjusted by means of a screw 217. This allows adjustment of the effective lengths of the torque arm 202 and the rocker arm 196. The upper end of the torque arm 202 is clamped to one end 204 of a torque rod 209 by means of a small cap screw 205 and the other end of the torque rod 209 is clamped to the beam 33 between a fixed shoulder 205 and a nut 210 as shown in Fig. 3. One end of a small tension spring 208 is attached to the torque arm 202, and the other end of the tension spring is attached to a fixed bracket 207. The tension spring 208 is used to insure that all lost motion is removed from the linkage used to adjust the tension of the torque rod 209.

The intermediate output shaft 150 of the gear transmission is used for driving the potentiometer wiper arms 213, 220 and 221. The wiper arms are not attached directly to the intermediate shaft 150, but are attached to the driven element of electromagnetic clutches 212 and 216. When the movable clutch plate 211 of the electromagnetic clutch 212 is moved axially, it will connect the wiper arm 213 to the intermediate shaft 150. The wiper arm 213 will then move over the variable resistance 214 to give an electrical output proportional to the rotation of the intermediate shaft 150. This output which indicates change in altitude is used for holding the aircraft at a fixed altitude, which altitude is equal to the altitude at which electromagnetic clutch 212 was energized. The wiper arm 213 is normally in a central position with respect to the variable resistance 214 when the clutch 212 is de-energized, inasmuch as the beam 33 is normally in a balanced position. Two stops 224 and 225 are provided in the potentiometer housing for limiting the radial movement of the wiper arm 213 to a predetermined arc on each side of its neutral position. When the wiper arm 213 contacts either of these two stops, the gear train is locked and the friction clutch which connects the output of the variable speed transmission to the gear train will slip. This will result in the beam 33 remaining in an unbalanced position until the aircraft is returned to an altitude which is within the range of movement of the wiper arm 213. Thus, the friction clutch between the variable speed drive and the gear train acts as a memory device to retain the altitude at which the clutch 212 was energized. When the clutch 216 is energized, during a flight attitude of decreasing altitude, the wiper arms 220 and 221 will travel over the variable resistances 222 and 223 to give a continuously variable electrical output proportional to altitude change. Thus, the output of potentiometer 222 and 223 may be used to control the descent of the aircraft such as during an approach. The actual rate of descent will be controlled by the pilot or autopilot, while the instrument of this invention will indicate whether the rate of descent is being exceeded or not. Of course, suitable switches should be provided so that it will be impossible to energize both clutches 212 and 216 simultaneously inasmuch as they are designed to control opposite movements of the aircraft.

The operation of the above altitude controller can more easily be understood by referring to the schematic diagram shown in Fig. 2. In this diagram, the barometric pressure $P_s$ is admitted to the bellows housing 10. Any change in the barometric pressure will be reflected in a movement of the evacuated bellows 23. This movement of the evacuated bellows will, in turn, be sensed by the pneumatic pick-off 11 at the opposite end of the beam. This type of pneumatic pick-off is very accurate in sensing any movement of the beam, thus giving the instrument a fast response with very little dead band. The signal of the pneumatic pick-off 11 will be amplified by the amplifier 12, which in turn will supply a modulated pressure $P_0$ to the pneumatic actuator 13. The pneumatic amplifier 12 is of the type wherein bleed-off of the regulated pressure $P_0$ is controlled so that the pneumatic amplifier will supply pressure which varies from a certain minimum to a maximum equal to the regulated pressure $P_0$ in response to the pneumatic signal from the pick-off 11. Thus, the amplifier 12 will convert the pressure difference between the two orifices to a single, variable pressure. The pneumatic actuator 13, in turn, will position the variable speed device which is driven by the constant speed motor 120. The output shaft 141 of the variable speed device 14 will rotate in a direction so as to either increase or decrease the torque of the torsion spring 16 to return the beam 33 to a null or balanced position. The output of the variable speed drive 14 is also used to rotate the intermediate shaft 150. The intermediate shaft 150, in turn, is used to operate the wiper arms 213 or 220 and 221, depending upon which of the magnetic clutches 212 and 216 are energized. As was explained above, the output of the potentiometers 214, 222 and 223 are used to control various motions of the aircraft.

In case it is desired to derive an output from the instrument which indicates the rate of change of altitude all that is necessary is to connect the wiper arm of a potentiometer to the actuator rod 96 of the pneumatic actuator 13. This is shown schematically in Fig. 2 by a variable resistance 230 having a wiper arm 231. The wiper arm 231 is connected to the actuator rod 96 by means of a suitable linkage 232. An output signal will then appear across the terminals 233 and 234 which will be proportional to the rate of change of altitude.

While but one embodiment of this invention has been described in detail, various modifications and improvements will occur to those skilled in the art. For example, various outputs other than those described above can be provided. If it is desired to provide an output proportional to an entire altitude range, such as an altimeter, the mechanical position of the shaft 160 on which the cam gear 155 is mounted, will supply such an output. Also, the mechanical position of the shaft 161 on which the cam gear 156 is mounted will supply a mechanical output equivalent to the actual barometric pressure. Thus, this invention should not be restricted to the specific embodiment described in detail above, but only to its broad spirit and scope.

We claim:

1. A device for converting barometric pressure changes to useful outputs comprising: a closed chamber; conduit means for connecting said chamber to a source of barometric pressure; an evacuated bellows mounted in said chamber and connected to one end of a pivoted beam; pneumatic means for sensing the position of the other end of said beam; said pneumatic means positioning a variable speed drive in response to the movement of the other end of said beam; said drive being connected to an output shaft; the rotation of said shaft repositioning a force balancing means to return said beam to a null position; and said shaft, in addition, positioning a variable resistance for indicating the incremental change in altitude.

2. A device for converting barometric pressure changes to useful outputs comprising: a closed chamber; conduit means for connecting said chamber to a source of barometric pressure; an evacuated bellows mounted in said chamber and connected to one end of a pivoted beam; a torsion spring having one end fixed to said beam and the other end connected to an adjustable member; the other end of said beam actuating a pneumatic sensing device for detecting movement of said beam from a null position; the output of said pneumatic device positioning a variable speed drive having an output shaft; said output shaft being connected to said adjustable member so as to adjust said torsion spring to return said beam to a null position; said shaft, in addition, varying a resistance as a function of the incremental change in altitude.

3. An altitude controller comprising: a closed chamber; means for introducing barometric pressure into said chamber; an evacuated bellows mounted in said chamber and connected to one end of a pivoted beam; adjustable balance means for said beam; sensing means for sensing movement of said beam from a null position; said sensing means actuating a variable drive means to adjust said balance means to return said beam to the null position; the output of said variable drive means, in addition, being used to position a variable resistance as a function of the incremental change in altitude.

4. An altitude device comprising: a closed chamber subject to barometric pressure; an evacuated bellows mounted in said closed chamber; said bellows being connected to a pivoted beam; adjusting means for varying a force means connected to said beam so as to maintain said beam in a null position; pneumatic means for detecting movement of said beam; a variable drive means connected to said pneumatic means; said pneumatic means positioning said variable drive means to vary said force means to return said beam to a null position; said variable drive means, in addition, positioning a variable resistance as a function of the change in altitude.

5. A device for converting barometric pressure changes to useful outputs comprising: a closed chamber; conduit means for connecting said chamber to a source of barometric pressure; an evacuated bellows mounted in said chamber and connected to one end of a pivoted beam; a torsion spring having one end fixed to said beam and the other end connected to an adjustable member; a pneumatic sensing device comprising opposed nozzles mounted on opposite sides of the other end of said beam; a source of metered, pressurized fluid connected to each of said nozzles; a baffle attached to the other end of said beam and projecting between said nozzles; said baffle controlling the flow of fluid from said nozzles in response to movement of said beam; the pressure differential of said pneumatic sensing device positioning a variable drive having an output shaft; said output shaft being connected to said adjustable member so as to adjust said torsion spring to return said beam to a null position; said shaft, in addition, varying a resistance as a function of the incremental change in altitude.

6. A device for converting barometric pressure changes to useful outputs comprising: a closed chamber; conduit means for connecting said chamber to a source of barometric pressure; an evacuated bellows mounted in said chamber and connected to one end of a pivoted beam; a torsion spring having one end fixed to said beam and the other end connected to an adjustable member; the other end of said beam actuating a pneumatic sensing device for detecting movement of said beam from a null position; the output of said pneumatic device being connected to a pneumatic amplifier; the signal from said amplifier connected to a pneumatic actuator, said actuator positioning a variable speed drive to control the rotation of an output shaft; said output shaft being connected to said adjustable member so as to adjust said torsion spring to return said beam to a null position; said shaft, in addition, varying a resistance as a function of the incremental change in altitude.

7. A device for converting barometric pressure changes to useful outputs comprising: a closed chamber; conduit means for connecting said chamber to a source of barometric pressure; an evacuated bellows mounted in said chamber and connected to one end of a pivoted beam; a torsion spring having one end fixed to said beam and the other end connected to an adjustable member; the other end of said beam actuating a pneumatic sensing device for detecting movement of said beam from a null position; the output of said pneumatic device positioning a variable speed drive having an output shaft; said output shaft being connected to said adjustable member so as to adjust said torsion spring to return said beam to a null position; said shaft, in addition, varying a resistance as a function of the incremental change in altitude; and follow-up means connected to said variable speed drive to assist said torsion spring to return said beam to a null position.

8. An instrument comprising: a closed chamber; a source of pressure; the changes in which are to be measured; said pressure communicating with said chamber; an evacuated bellows mounted in said chamber and connected to one end of a pivoted beam; said beam being force balanced by means of a torsion spring; a pneumatic pick-off mounted adjacent the other end of said beam; the output of said pick-off being connected to a pneumatic amplifier; the output of said amplifier being connected to a pneumatic actuator; said actuator positioning a variable drive means having an output shaft connected to a gear train through a friction clutch; said gear train driving a set of cam gears; said torsion spring being connected to one of said cam gears so that the force of said spring may be adjusted to return said beam to a null position; and an electrical output device connected to said gear train by a releasable member.

9. A device for converting a measured pressure into an output proportional to the change in the measured pressure comprising: a closed chamber having means for introducing said measured pressure; an evacuated bellows mounted in said chamber; said bellows attached to one end of a pivoted beam having an adjustable force means for returning said beam to a null position; sensing means for determining the position of the other end of said beam; said sensing means actuating positioning means to reposition said adjustable force means to return said beam to a null position; and said positioning means, in addition, positioning a variable resistance.

10. An altitude controller comprising: a closed chamber; means for introducing a source of barometric pressure into said chamber; an evacuated bellows mounted in said chamber and connected to one end of a pivoted beam; adjustable balance means for said beam; sensing means for sensing movement of said beam from a null position; said sensing means actuating a variable drive means; said variable drive means being connected to an output shaft by means of a friction clutch; said output shaft being connected to said adjustable balance means to return said beam to a null position; and said output shaft, in addition, being connected to at least one variable resistance by means of a releasable member.

11. An altitude controller comprising: a closed chamber; means for introducing a source of barometric pressure into said chamber; an evacuated bellows mounted in said chamber and connected to one end of a pivoted beam; adjustable balance means for said beam; sensing means for sensing movement of said beam from a null position; said sensing means actuating a variable drive means; said variable drive means being connected to an output shaft by means of a friction clutch; said output shaft being connected to said adjustable balance means through a gear train containing at least one set of cam gears so as to return said beam to a null position; and said output shaft, in addition, positioning at least one variable resistance.

12. A device for converting barometric pressure changes to an output representing the rate of change of altitude comprising: an enclosed chamber; conduit means for introducing a source of barometric pressure into said chamber; an evacuated bellows mounted in said chamber; said bellows being pivotally connected to one end of a beam; adjustable force means for returning said beam to a balanced position; sensing means for detecting the position of the other end of said beam; the signal from said sensing means being amplified and used to position a variable drive; the output of said variable drive being used to adjust said force means to return said beam to a balanced condition and the amplified signal from said sensing means being used to position a variable resistance to give a signal representing the rate of change of said barometric pressure.

13. A device for converting barometric pressure changes to useful outputs comprising: a closed chamber; conduit means for connecting said chamber to a source of barometric pressure; an evacuated bellows mounted in said chamber and connected to one end of a pivoted beam; a torsion spring having one end fixed to said beam and the other end connected to an adjustable member; the other end of said beam actuating a pneumatic sensing device for detecting movement of said beam from a null position; the output of said pneumatic device being connected to a pneumatic amplifier; the signal from said amplifier connected to a pneumatic actuator, said actuator positioning a variable speed drive to control the rotation of an output shaft; said output shaft being connected to said adjustable member so as to adjust said torsion spring to return said beam to a null position; and the movable member of a potentiometer connected to a pneumatic actuator thereby giving an output which varies as the rate of change of altitude.

References Cited in the file of this patent

UNITED STATES PATENTS

| | | |
|---|---|---|
| 2,524,998 | Schoeppel et al. | Oct. 10, 1950 |
| 2,598,681 | Garbarini et al. | June 3, 1952 |
| 2,622,177 | Klose | Dec. 16, 1952 |
| 2,729,780 | Miller et al. | Jan. 3, 1956 |